United States Patent [19]
Ueki et al.

[11] Patent Number: 4,463,393
[45] Date of Patent: Jul. 31, 1984

[54] REPEAT PLAYBACK DEVICE FOR TAPE RECORDER

[75] Inventors: Yoshiharu Ueki; Shouzaburou Sakaguchi, both of Saitama, Japan

[73] Assignee: Pioneer Electronic Corporation, Tokyo, Japan

[21] Appl. No.: 344,691

[22] Filed: Feb. 1, 1982

[30] Foreign Application Priority Data

Feb. 7, 1981 [JP] Japan ............................. 56-16448[U]

[51] Int. Cl.³ .......................................... G11B 15/48
[52] U.S. Cl. ................................. 360/74.1; 360/72.2; 360/69
[58] Field of Search ................... 360/69, 71, 74.1, 82, 360/13, 25, 90

[56] References Cited

U.S. PATENT DOCUMENTS 4,301,482 11/1981 Trevithick ........................ 360/74.4
4,342,056 7/1982 Ishii et al. ....................... 360/74.4
4,366,514 12/1982 Sato et al. ....................... 360/74.4

Primary Examiner—Aristotelis M. Psitos
Assistant Examiner—Kin Wong
Attorney, Agent, or Firm—Sughrue, Mion, Zinn, Macpeak, and Seas

[57] ABSTRACT

A repeat playback circuit device for use in a tape recorder in which the tape recorder is prevented from jumping again into a inter-music detection mode before the beginning of a desired segment of music is detected. During a normal play operation, pulses from an oscillator source are applied to the clock input of a counter while pulses indicative of the presence of a segment of music are applied to the clear input of the counter to thus prevent the counter from reaching a predetermined count. At the end of the segment of music, the pulses applied to the clear input of the counter are removed, whereupon the counter can then reach the predetermined count. When the counter does in fact reach the predetermined count, the tape recorder is set to the rewind mode where it remains until a blank segment is detected, at which time the tape recorder is placed in the play mode. The counter is set to be ready to detect a blank portion on the tape at the beginning of a segment of music when in the play mode.

10 Claims, 2 Drawing Figures

REPEAT PLAYBACK DEVICE FOR TAPE RECORDER

BACKGROUND OF THE INVENTION

The present invention relates to a repeat playback device for use in a tape recorder.

In a conventional repeat playback device of this general type, when a portion of a magnetic tape where nothing is recorded (hereinafter referred to as "a blank portion" or "an inter-music portion", when applicable) is detected, the tape recorder is placed in a rewinding mode. However, this repeat system suffers from a problem in that, if the recorder is set to the play mode immediately after the rewinding operation, a blank portion will again be present for a predetermined period of time before a segment of music recorded in the tape is reproduced and will be detected. In some situations, the detection of this leading blank portion may cause the tape recorder to be undesirably placed in the rewinding mode again, as a result of which a segment of music which is recorded on the tape before the desired segment of music is played.

In order to overcome this difficulty a system has been employed in which, after the tape recorder is placed in the play mode, inter-music detection is inhibited for a certain period of time. However, this system involves various drawbacks in that the proper period of time during which inter-music detection should be inhibited in actuality is variable and a large number of components is required for implementating the necessary circuitry.

In view of the above-described drawbacks, an object of the invention is to provide a repeat playback device for use in a tape recorder, in which, when the tape recorder is placed in the play mode after a rewinding operation, the tape recorder is prevented from jumping again into the inter-music detection mode before the beginning of the desired segment of music is detected.

SUMMARY OF THE INVENTION

In accordance with these, and other objects of the invention, there is provided a repeat playback device for use in a tape recorder including tape running state control circuit means, music beginning detecting circuit means, and control circuit means. The tape running state control circuit means switches the operational mode of the tape recorder from a rewinding mode to a play mode after a rewinding operation has been accomplished. The music beginning detecting circuit means detects the beginning of a segment of music recorded on a magnetic tape, while the control circuit means sets the music beginning circuit detecting means in a state to be ready for detecting the beginning of a subsequent segment of music in response to the music beginning detecting circuit means detecting the start of a segment of music. Preferably, the music beginning detecting circuit means is implemented with a binary counter.

As used herein, "music" can refer to actual music recorded on a magnetic tape or to data or the like recorded on a magnetic tape, as the invention may be used to advantage with either analog or digital tape playing devices.

DESCRIPTION OF THE PREFERRED EMBODIMENTS

Figure 1:
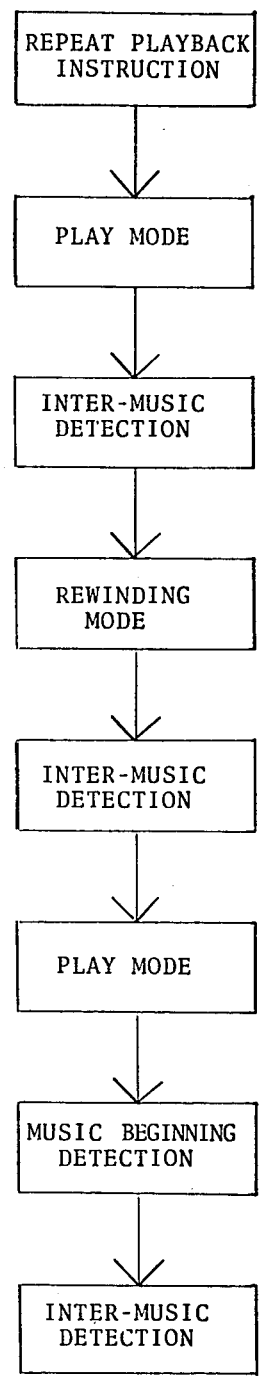
FIG. 1 is a flow chart for description of the operational control of a repeat playback device according to the invention.
Figure 2:
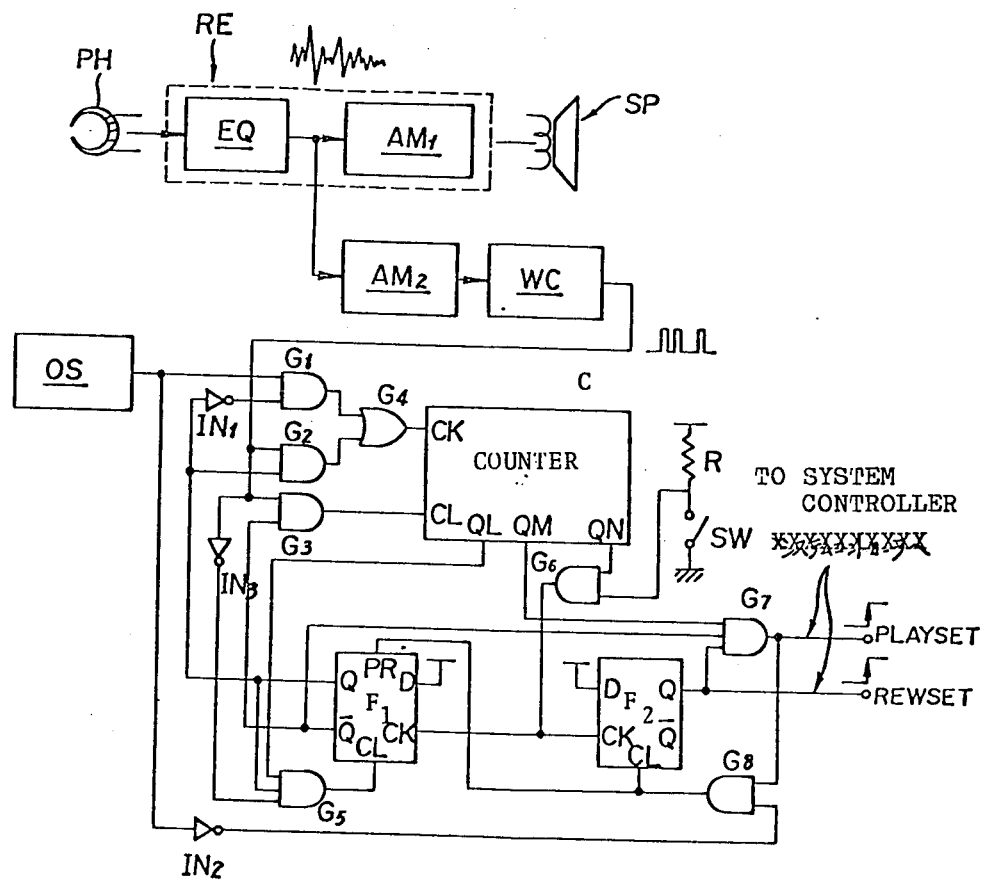
FIG. 2 is a circuit diagram of the repeat playback device according to the invention applied to an electronic tape recorder controller circuit.

A preferred embodiment of the inventin will be described with reference to the accompanying drawings. An operational control of a repeat playback device according to the invention is briefly summarized in FIG. 1 by way of a flow chart, from which the basic operation of the repeat playback device can be readily understood. FIG. 2 is a circuit diagram showing the electronic cassette tape deck controller circuit to which the technical concept of the invention is applied.

In FIG. 2, reference character PH designates a playback head; RE, a reproduction circuit having an equalizer EQ and an amplifier $AM_1$; and SP, a loudspeaker. Further, reference character $AM_2$ designates an amplifier connected to the output of the equalizer EQ; WC, a waveform shaping circuit, the output of which is connected to first inputs of AND gates $G_2$ and $G_3$; OS, a clock pulse oscillator, the output of which is connected to one input of an AND gate $G_1$, the outputs of the AND gates $G_1$ and $G_2$ being connected to the inputs of an OR gate $G_4$; and reference character C designates an N-bit counter. The output of the OR gate $G_4$ is connected to the clock pulse input terminal CK of the counter C and the output of the AND gate $G_3$ is connected to the clear signal input terminal CL of the counter C. The outputs $Q_L$, $Q_M$ and $Q_N$ of the counter C are set so as to meet with the relationship of $N>M>L$. Flip-flops $F_1$ and $F_2$ are provided. The output Q of the flip-flop $F_1$ is connected through an inverter $IN_1$ to the other input of the AND gate $G_1$ and it is further connected to an input of a 3-input AND gate $G_5$. Another input of the AND gate $G_5$ is connected through an inverter $IN_3$ to the output of the waveform shaping circuit WC, and the remaining input of the AND gate $G_5$ is connected to the output $Q_L$ of the counter C. The output of the AND gate $G_5$ is connected to the clear input CL of the flip-flop $F_1$. The output $\overline{Q}$ of the flip-flop $F_1$ is connected to the other input of the AND gate $G_3$ and also to an input of a 3-input AND gate $G_7$. The remaining two inputs of the AND gate $G_7$ are connected to the output $Q_M$ of the counter C and to the output Q of the flip-flop $F_2$, respectively. The output Q of the flip-flop $F_2$ is delivered, as a rewinding mode set signal, to a system controller (not shown). The output of the AND gate $G_7$ is applied as a play mode set signal to the system controller and also connected to an input of an AND gate $G_8$, the other input of which is connected through an inverter $IN_2$ to the output of the oscillator OS. The output of the AND gate $G_8$ is connected to the preset input PR of the flip-flop $F_1$ and the clear input CL of the flip-flop $F_2$. The clock inputs CK of the flip-flops $F_1$ and $F_2$ are connected together and further connected to the output of an AND gate $G_6$. One input of the AND gate $G_6$ is connected to the output $Q_N$ of the counter C and the other is connected to the "hot" (ungrounded) contact of a repeat switch SW, which is also connected through a resistor R to a power source. The data inputs D of the flip-flops $F_1$ and $F_2$ are connected to the power source.

The operation of the circuit thus constructed will be described.

A signal produced by the playback head PH, after passing through the equalizer EQ and the amplifier $AM_1$ in the reproduction circuit RE, is reproduced by the loudspeaker SP. The output signal of the equalizer EQ, after being amplified by the amplifier $AM_2$, is converted into a signal pulse train by the waveform shaping circuit WC. The signal pulse train has a voltage level equivalent to a low logic level "L" for blank portions of the magnetic tape which are located between segments of music recorded. Normally, the flip-flops $F_1$ and $F_2$ are in the reset (clear) state.

During the reproduction of signals recorded on a tape, the output clock pulse train from the oscillator circuit OS is inputted through the gates $G_1$ and $G_4$ to the terminal CK of the counter C, while the recorded signal pulse train is applied through the gate $G_3$ to the terminal CL of the counter C. At this time, the count value of the counter C does not increase because of the presence of the clear signal.

When a segment of music has ended, the terminal CL of the counter C is set to "L", whereupon the counter C starts counting the clock pulses applied to the terminal CK. After the counter has counted the clock pulses for a predetermined detection time (for example, about three seconds), the output $Q_N$ of the counter C is raised to a high logic level "H". The detection time can be set to a desired value by controlling the frequency of the clock pulses applied to the counter C and the number N of stages of the counter.

When the repeat switch SW is off (repeat acceptance mode), the output $Q_N$ of the counter C is applied through the gate $G_6$ to the flip-flops $F_1$ and $F_2$ to set (preset) both of the flip-flops $F_1$ and $F_2$. The recorder then rewinds the tape in response to the output Q of the flip-flop $F_2$.

As the flip-flop $F_1$ is set, the terminal CL of the counter C is set to "L" through the gate $G_3$. The signal pulse train is then inputted through the gates $G_2$ and $G_4$ to the terminal CK of the counter C, whereupon the counter C counts the pulses of the signal pulse train. When a predetermined number of pulses has been counted (or when a segment of music is detected in the rewinding mode), the output $Q_L$ of the counter C is raised to "H". In response to the fall of the next pulse of the signal pulse train, the flip-flop $F_1$ is reset (cleared) through the inverter $IN_3$ and the gate $G_5$. Then, the output clock pulse train from the oscillator OS is inputted to the terminal CK of the counter C through the gates $G_1$ and $G_4$ while the signal pulse train is inputted to the terminal CL of the counter C, and hence the counter C suspends its counting operation and the inter-music detection mode is again attained.

When, in the rewinding mode, an inter-music portion at the beginning of a music segment is reached, the output $Q_M$ of the counter C is raised to "H". Therefore, the play mode set signal is outputted through the gate $G_7$ to the system controller to set the tape recorder in the play mode.

In response to the next fall of the clock pulse train from the oscillator OS, the flip-flop $F_2$ is cleared through the inverter $IN_2$ and the gate $G_8$, and the output of the gate $G_8$ is applied to the terminal PR of the flip-flop $F_1$ to preset the flip-flop $F_1$ so that the counter C is then ready to count the pulses of the signal pulse train. That is, the circuit is taken out of the inter-music detection mode. The desired segment of music will then start.

When the counter C has counted pulses of the signal pulse train to the predetermined number, the output $Q_L$ of the counter C is again raised to "H". In response to the next fall of the signal pulse train, the flip-flop $F_1$ is reset (cleared) through the inverter $IN_3$ and the gate $G_5$, whereupon the clock pulse signal is applied to the terminal CK of the counter C and the signal pulse train is inputted to the terminal CL of the counter C. Therefore, a subsequent inter-music detection mode is effected and one complete cycle of the repeat mode operation has been accomplished.

As is apparent from the above description, when the play mode is effected after the rewinding operation, the system cannot jump into the inter-music detection mode before the start of music is detected. Therefore, the difficulty that the rewinding mode is effected before the music starts after the play mode has been effected is positively prevented. Since all the repeat control signals are processed digitally, the repeat playback device of the invention can be implemented in the form of an integrated circuit. Thus, the device of the invention can be manufactured with a small size and at a low cost.

We claim:

1. In a repeat playback device for use in a tape recorder, the playback device being of the type which places the recorder in a rewinding mode upon the detection of a blank tape segment following the end of a music segment in a playing mode, and which at the end of the rewinding mode places the recorder in a playing mode to repeat the playback of the music segment, the improvement, which prevents placing the recorder in the rewinding mode when a blank tape segment occurs prior to the beginning of a music segment after the recorder has been placed in a playing mode following a rewinding mode, comprising:

tape running state control circuit means for switching an operational mode from a rewinding mode to a play mode after a rewinding operation has been accomplished;

music beginning detecting circuit means for detecting the beginning of a segment of music recorded on a magnetic tape;

and control circuit means for setting said music beginning detecting circuit means in a state to be ready for detecting the beginning of a subsequent segment of music in response to said music beginning detecting circuit means detecting the start of a segment of music.

2. The repeat playback device of claim 1 wherein said music beginning detecting circuit means comprises counter means for detecting the end of a segment of recorded music.

3. The repeat playback device of claim 2 wherein said control circuit means comprises means for coupling a source of pulses representative of the presence of a music segment on a tape to a clock input of said counter means in said rewinding mode and to a clear input of said counter means in a playing mode and for coupling output pulses produced by an oscillator source to said clock input of said counter means in said playing mode.

4. The repeat playback device of claim 3 wherein said tape running state control circuit means comprises a first flip-flop, said first flip-flop having a clock input coupled to a count output bit of said counter means.

5. The repeat playback device of claim 4 wherein said control circuit means comprises a second flip-flop having a clock input coupled to said clock input of said first flip-flop, and gating means operating in response to outputs of said second flip-flop for coupling one of said source of said pulses representing the presence or absence of a segment of music and said oscillator pulse source to said clock input of said counter means.

6. The repeat playback device of claim 5 wherein said tape running state control circuit means further comprises first gating means operating in response to a second output from said counting means and to outputs from said first and second flip-flops for setting said tape recorder to said play mode, and second gating means for setting said first and second flip-flops to predetermined states when an output signal produced by said first gating means is in a state indicative of said play mode.

7. A repeat playback device for use in a tape recorder, comprising:
means for producing a train of pulses representative of the presence of a music segment on a tape, said train of pulses being in a low logic state when no segment of music is present; an oscillator for producing a continuous train of pulses; a binary counter; first and second flip-flops; first through seventh AND gates; an OR gate; first through third inverters; and an automatic repeat switch, a first input of said first AND gate being coupled to an output of said oscillator, a first input of said second AND gate being coupled to an output of said means for producing pulses representative of the presence of a music segment, outputs of said first and second AND gates being coupled to corresponding inputs of said OR gate, an output of said OR gate being coupled to a clock input of said counter, a Q output of said first flip-flop being coupled to a second input of said second AND gate and an input of said first inverter, an output of said first inverter being coupled to a second input of said first AND gate, a $\overline{Q}$ output of said first flip-flop being coupled to a first input of said third AND gate, a second input of said AND gate being coupled to said output of said means for producing a train of pulses representative of the presence of a music segment and to an input of said second inverter, a first input of said fourth AND gate being coupled to a first count output bit of said counter, a second input of said fourth AND gate being coupled to said Q output of said first flip-flop, a third input of said fourth AND gate being coupled to an output of said second inverter, an output of said fourth AND gate being coupled to a clear input of said first flip-flop, a first input of said fifth AND gate being coupled to a second output bit of said counter, a second input of said fifth AND gate being coupled to said switch, an output of said fifth AND gate being coupled to clock inputs of said first and second flip-flops, a first input of said sixth AND gate being coupled to a third output bit of said counter, a second input of said sixth AND gate being coupled to said $\overline{Q}$ output of said first flip-flop, a third input of said sixth AND gate being coupled to a Q output of said second flip-flop, an input of said third inverter being coupled to said source of clock pulses, an output of said third inverter being coupled to a first input of said seventh AND gate, a second input of said seventh AND gate being coupled to an output of said sixth AND gate, an output of said seventh AND gate being coupled to a clear input of said second flip-flop and to a preset input of said first flip-flop, said second output bit of said counter being of higher order than said third output bit, said third output bit of said counter being of higher order than said second output bit, a play mode indicating signal being produced at said output of said sixth AND gate, and a rewinding mode indicating signal being produced on said Q output of said second flip-flop.

8. A method for performing an automatic repeat playback operation in a tape recorder, comprising the steps of:
coupling a clock pulse source to a clock input of a counter and a source of pulses representing the presence of a segment of music to a clear input of said counter in a play mode of said tape recorder;
issuing a rewind control signal to set said tape recorder in a rewinding mode when said counter has reached a first predetermined count during a blank segment in said play mode when said pulses representative of the presence of a segment of music are absent;
coupling said source of pulses representative of the presence of a segment of music to said clock input of said counter in said rewinding mode of said tape recorder;
coupling said clock pulse source to said clock input of said counter and said source of pulses representing the presence of a segment of music to said clear input of said counter when said counter has reached a second predetermined count in said rewinding mode;
issuing a signal to set said tape recorder in said play mode after said counter has reached a third predetermined count in said rewinding mode and coupling said source of pulses representing the presence of a segment of music to said clock input of said counter; and
coupling said clock pulse source to said clock input of said counter and said source of pulses representing the presence of a segment of music to said clear input of said counter when said counter has reached a fourth predetermined count.

9. The method of claim 8 further comprising the step of applying a signal to said clear input of said counter in said rewinding mode in a logic state so as to enable said counter.

10. The method of claim 8 further comprising the step of choosing said second and fourth predetermined counts to be the same.

* * * * *